United States Patent
Yanagisawa

(10) Patent No.: US 12,389,129 B2
(45) Date of Patent: Aug. 12, 2025

(54) APPARATUS, IMAGE PROCESSING METHOD TO COMBINE IMAGES BASED ON FLICKER, AND STORAGE MEDIUM

(71) Applicant: CANON KABUSHIKI KAISHA, Tokyo (JP)

(72) Inventor: Keisuke Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 17/932,053

(22) Filed: Sep. 14, 2022

(65) Prior Publication Data
US 2023/0078758 A1    Mar. 16, 2023

(30) Foreign Application Priority Data
Sep. 15, 2021    (JP) ................. 2021-150259

(51) Int. Cl.
| | |
|---|---|
| *H04N 23/745* | (2023.01) |
| *H04N 5/265* | (2006.01) |
| *H04N 23/71* | (2023.01) |
| *H04N 23/72* | (2023.01) |
| *H04N 23/741* | (2023.01) |

(52) U.S. Cl.
CPC ........... *H04N 23/745* (2023.01); *H04N 5/265* (2013.01); *H04N 23/71* (2023.01); *H04N 23/72* (2023.01); *H04N 23/741* (2023.01)

(58) Field of Classification Search
None
See application file for complete search history.

(56) References Cited

U.S. PATENT DOCUMENTS

| | | | |
|---|---|---|---|
| 2015/0036878 A1* | 2/2015 | Nashizawa | ............... G06T 5/50 382/103 |
| 2020/0169658 A1* | 5/2020 | Nakamura | ........... H04N 23/741 |
| 2020/0213502 A1* | 7/2020 | Shigeta | ................ H04N 23/741 |
| 2020/0221028 A1* | 7/2020 | Kobayashi | ........... H04N 23/745 |

FOREIGN PATENT DOCUMENTS

| | | |
|---|---|---|
| JP | 2016-146592 A | 8/2016 |
| JP | 2020-028080 A | 2/2020 |
| JP | 2020-088651 A | 6/2020 |
| JP | 2020-178186 A | 10/2020 |

* cited by examiner

*Primary Examiner* — Samuel D Fereja
(74) *Attorney, Agent, or Firm* — Canon U.S.A., Inc. IP Division

(57) ABSTRACT

An apparatus includes an image sensor configured to capture a plurality of images, at least one memory configured to store instructions, and at least one processor in communication with the at least one memory and configured to execute the instructions to determine whether a flicker has occurred, and combine the plurality of images into a combined image. If the flicker occurs, the image sensor captures the plurality of images through application of different gains by performing one exposure. If the flicker does not occur, the image sensor captures the plurality of images by performing a plurality of exposures.

9 Claims, 7 Drawing Sheets

APPARATUS, IMAGE PROCESSING METHOD TO COMBINE IMAGES BASED ON FLICKER, AND STORAGE MEDIUM

BACKGROUND

Technical Field

One disclosed aspect of the embodiments relates to an apparatus, and in particular, to an imaging apparatus that combines a plurality of images in order to extend a dynamic range of an image.

Description of the Related Art

There is known a technique for acquiring an image with an extended dynamic range by combining a plurality of images different in exposure (high dynamic range (HDR) rendering). In the HDR rendering, the same subject area is imaged a plurality of times under different exposure conditions, and luminance levels are adjusted among the captured images different in luminance. The images can be combined into an image with a wide dynamic range by using an image captured with a high exposure for a low-luminance area and by using an image captured with a low exposure for a high-luminance area.

However, in a case where a flickering light source such as a light-emitting diode (LED) light source is present, there may be inconsistencies in a luminance level of a subject among the captured images due to flickering of the light source. Combining such images may result in unnatural rendering.

Japanese Patent Application Laid-Open No. 2016-146592 discusses a technique for performing HDR rendering on images captured under a flickering light source. The technique enables a combining ratio to be changed on the basis of an amplitude of a flicker in order to reduce an influence of the flicker.

However, if the combining ratio is changed using the technique described in Japanese Patent Application Laid-Open No. 2016-146592, the effect of increasing the dynamic range of a combined image may be reduced.

SUMMARY

One disclosed aspect of the embodiments is directed to, at the time of HDR rendering under a flickering light source, reducing an influence of flickering by an apparatus acquiring images different in gain by performing one exposure.

According to an aspect of the embodiments, an apparatus includes an image sensor configured to capture a plurality of images, at least one memory configured to store instructions, and at least one processor in communication with the at least one memory and configured to execute the instructions to determine whether a flicker has occurred, and combine the plurality of images into a combined image. If the flicker occurs, the image sensor captures the plurality of images through application of different gains by performing one exposure. If the flicker does not occur, the image sensor captures the plurality of images by performing a plurality of exposures.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the accompanying drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above A first exemplary embodiment will be described with reference to the drawings.

Figure 1:
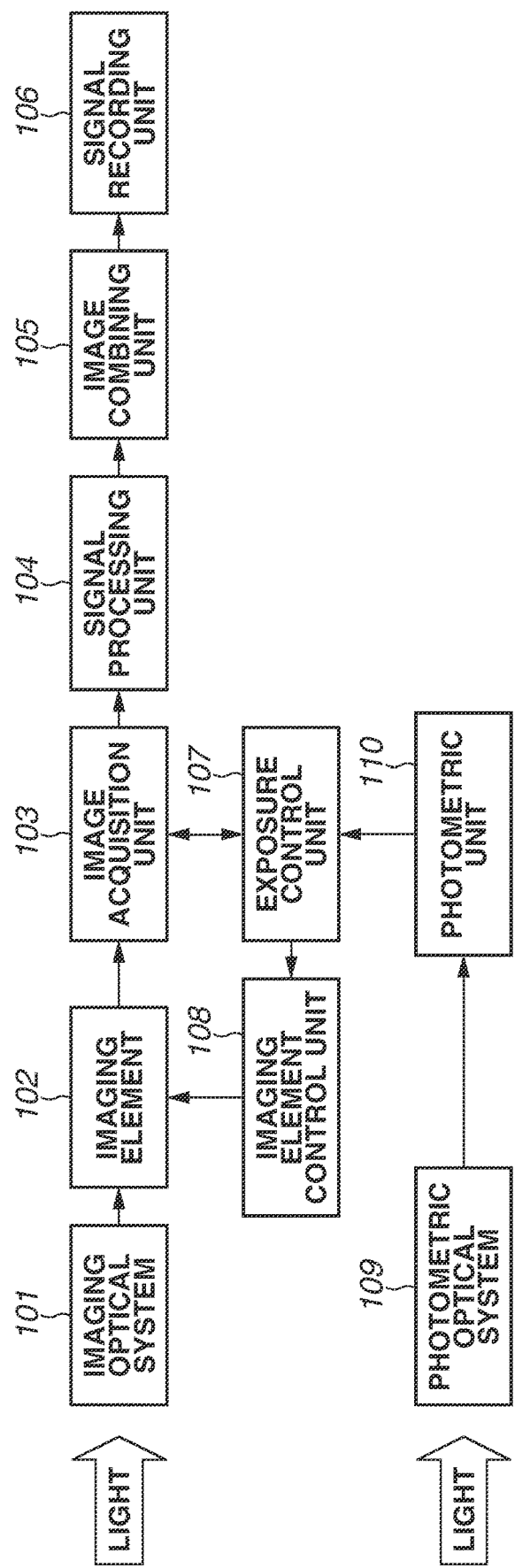
FIG. 1 is a block diagram illustrating a structure of a digital camera according to a first exemplary embodiment.

FIG. 1 is a block diagram illustrating a structure of a digital camera according to the present exemplary embodiment. Each block illustrated in FIG. 1 will be described in detail below.

An imaging optical system 101 takes in light from a subject and focuses the light on an imaging element 102.

Upon receipt of incident light from the imaging optical system 101, the imaging element 102 converts the light into electrical signals and output the electrical signals. The imaging element 102 typically includes charge coupled device (CCD) image sensors, complementary metal oxide semiconductor (CMOS) image sensors, or the like.

Some video signals outputted from the imaging element 102 are directly outputted as analog video signals, and other video signals are subjected to analog-to-digital (AD) conversion in the imaging element 102 and outputted as digital data by low-voltage differential signaling (LVDS) or the like.

An example of the imaging element 102 will be described.

Figure 2:
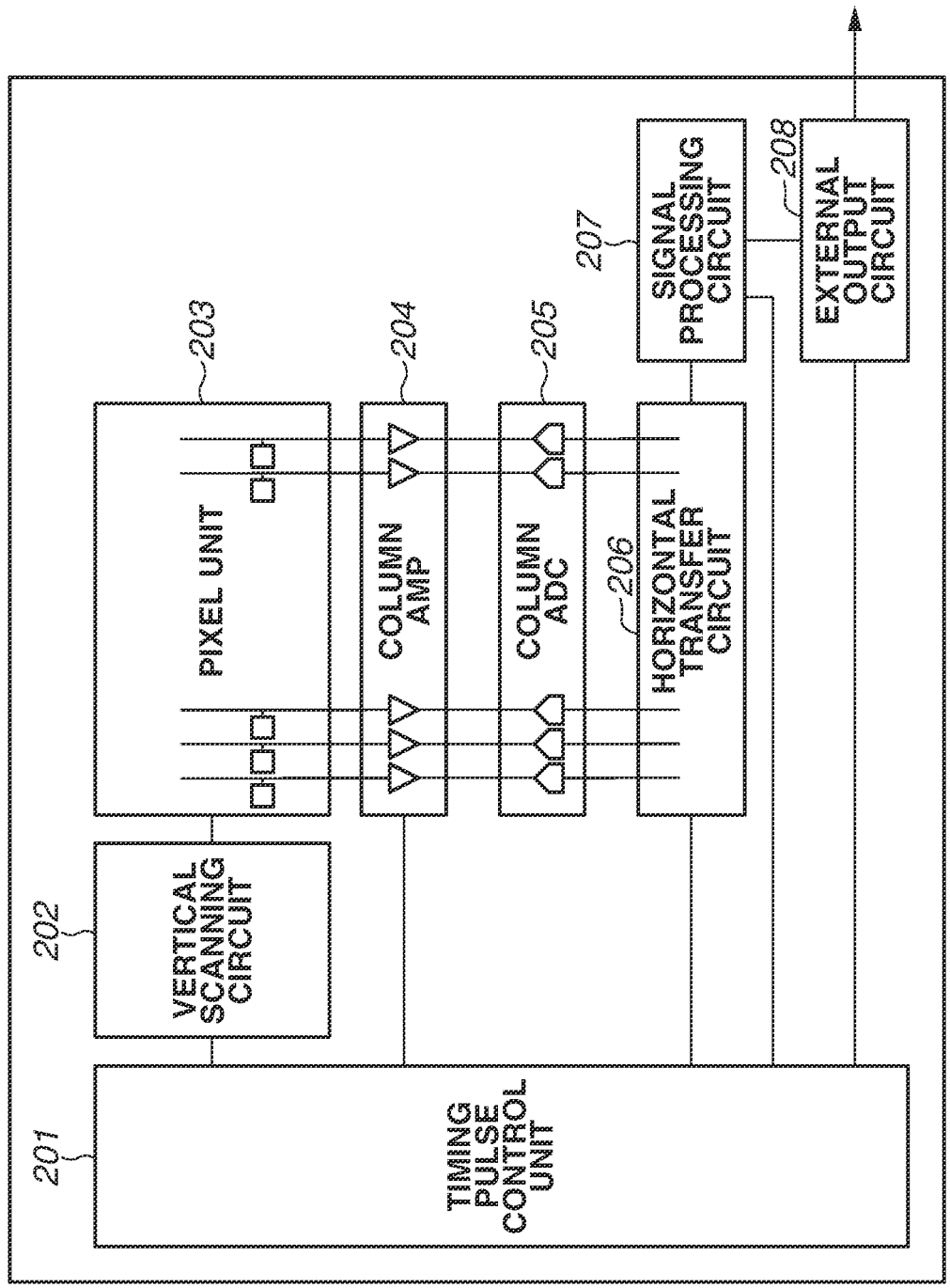
FIG. 2 is a block diagram illustrating a structure of an example of an imaging element according to the first exemplary embodiment.

FIG. 2 is a block diagram illustrating a structure of an example of the imaging element 102 according to the present exemplary embodiment.

A timing pulse control unit or circuit 201 controls operations of the imaging element 102 by supplying an operation clock or a timing signal to each of the blocks of the imaging element 102.

A vertical scanning circuit 202 performs timing control to read pixel signal voltages in sequence into one frame from a two-dimensionally arranged pixel unit or circuit 203. In general, video signals are read in sequence line by line from upper to lower lines into one frame.

The pixel unit 203 is a photoelectric conversion element that performs photoelectric conversion based on an amount of incident light and outputs a resultant voltage. In the present exemplary embodiment, the pixel unit 203 converts light that has been taken in into electric charges and accumulates the electric charges in a capacitance floating diffusion (FD). Capacitance of the FD can be changed between two types, large and small. The capacitance can be changed based on International Standards Organization (ISO) sensitivity to improve a signal-to-noise (SN) ratio characteristics. Basically, the capacitance is set to be large with low ISO sensitivity, and the capacitance is set to be small with high ISO sensitivity. At the time of output of two images different in gain described below, the capacity for accumulating electric charges is common to the two gains. The types of capacity are not limited to large and small in the present exemplary embodiment, and three or more types may be provided.

A column amplifier (AMP) 204 is used to electrically amplify the signals read from the pixel unit 203. By amplifying the signals by the column AMP 204, signal levels of pixels can be increased relative to noise made by a column AD converter (ADC) 205 subsequent to the column where amplification has been performed, thereby the SN ratio can be equivalently improved. The gain of the column AMP 204 can be changed by the timing pulse control unit 201. The imaging element 102 may have two input memories for HDR image generation in the column AMP 204 to output two types of gain by changing the gain of the column AMP 204. The two input memories makes it possible to apply two gains to a signal read from the FD at a certain time. Accordingly, although a data amount increases, images with two different gains can be simultaneously obtained. Two outputs are provided here, but the number of simultaneous outputs is not limited in the present exemplary embodiment.

The column ADC 205 subjects the signals read from the column AMP 204 to analog-to-digital conversion.

The digitized signals are read in sequence by a horizontal transfer circuit 206.

The output of the horizontal transfer circuit 206 is input into a signal processing circuit 207. The signal processing circuit 207 is a circuit that performs digital signal processing. The signal processing circuit 207 can perform simple gain calculation by adding a certain amount of offset values or performing a shift operation or multiplication in digital processing. The pixel unit 203 may have an intentionally light-shielded pixel area to perform a digital black-level clamp operation using the pixel area.

The output of the signal processing circuit 207 is passed to an external output circuit 208. The external output circuit 208 has a serializer function to convert a multibit input parallel signal from the signal processing circuit 207 into a serial signal. The external output circuit 208 also converts the serial signal converted by the signal processing circuit 207 into, for example, a LVDS signal or the like, and outputs the same as image information to be passed to an external device.

An image acquisition unit or circuit 103 includes blocks that capture and process the video signals outputted from the imaging element 102. If no AD conversion is performed in the imaging element 102, the image acquisition unit 103 also includes an analog front end that performs analog-to-digital conversion. The image acquisition unit 103 removes fixed pattern noise of the imaging element 102, and performs black-level clamp processing. The image acquisition unit 103 also performs the role of separating the video signals into images to be used for video signal recording and evaluation signals for control of the imaging element 102.

A signal processing unit or circuit 104 performs a pixel addition function that is a typical image processing function of a digital camera, and various types of image processing such as noise reduction, gamma correction, knee correction, digital gain, and defect correction. Besides, the signal processing unit 104 performs a flicker detection process and a calculation process of a flicker peak timing. The image acquisition unit 103 and the signal processing unit 104 each include a storage circuit for storing a setting value necessary for the corrections and the image processing, but the storage circuit is not illustrated in the block diagram.

An image combining unit or circuit 105 combines images or frames of a video for HDR rendering output from the signal processing unit 104, in order to generate an HDR image by using any combining method. The image combining unit or circuit 105 can use a plurality of images of different narrow dynamic range to generate a combined image of wider dynamic range. Here, "to combine images" means "to use a part of each of the images to generate another image".

A signal recording unit or circuit 106 records the video signals received from the image combining unit 105 in a storage device or a storage medium.

An exposure control unit or circuit 107 can calculate an optimum exposure amount from photometric information received from a photometric unit or circuit 110 described below. Then, the exposure control unit 107 determines operation of an imaging element control unit or circuit 108 and exerts control.

A photometric optical system 109, as with the imaging optical system 101, takes in light from the subject and puts the light into the photometric unit 110.

The photometric unit 110 subjects the light taken in by the photometric optical system 109 to photoelectric conversion, and transmits the photometric information to the exposure control unit 107.

Next, a method for acquiring a plurality of images based on s result of flicker detection and combining the acquired plurality of images into an HDR image will be described with reference to the drawings.

Figure 3:
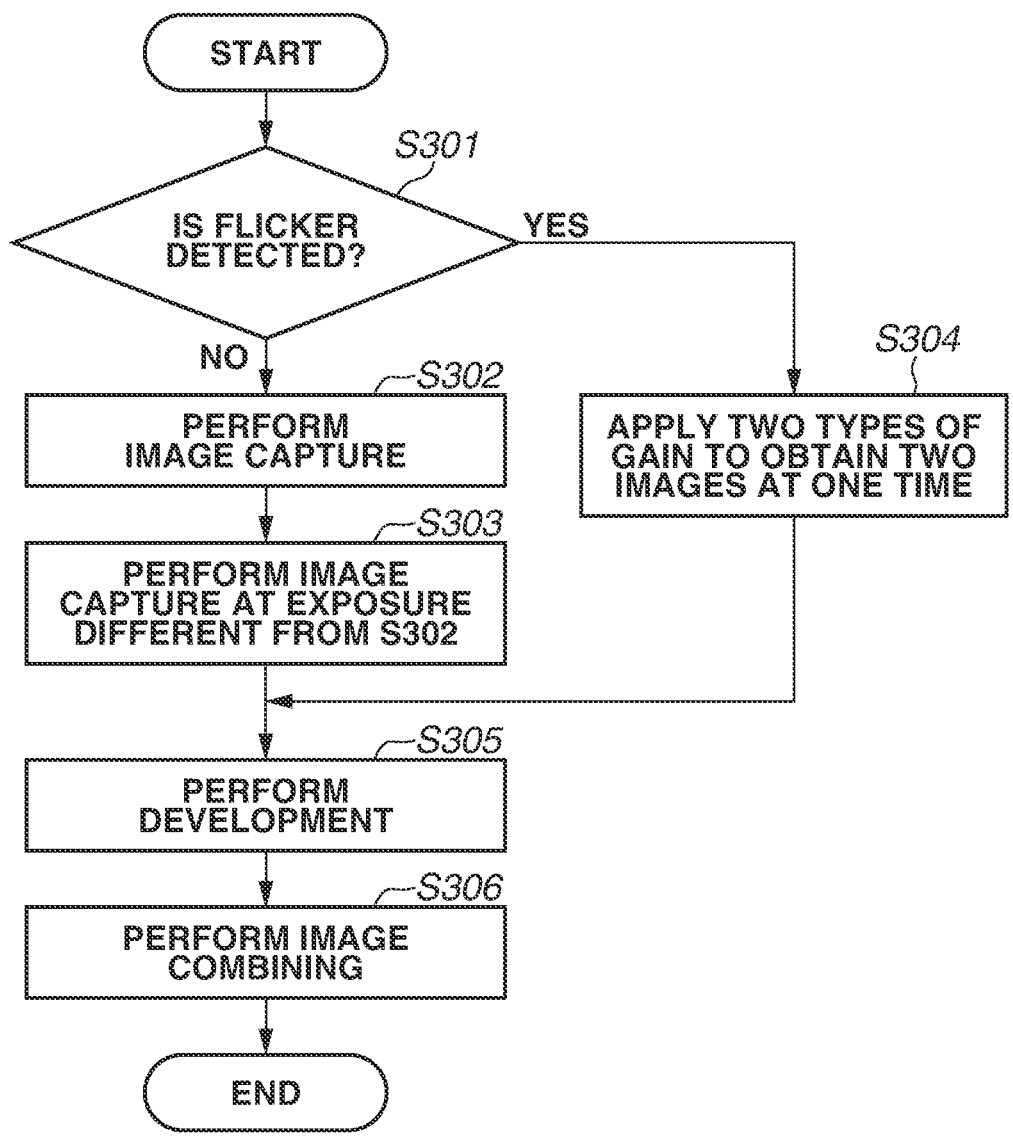
FIG. 3 is a flowchart illustrating high dynamic range (HDR) rendering according to the first exemplary embodiment.

FIG. 3 is a flowchart illustrating HDR rendering according to the present exemplary embodiment.

First, in step S301, presence or absence of a flicker is determined using the photometric information acquired by the photometric unit 110, or an operation to detect if a flicker occurs in step S301.

Figure 4:
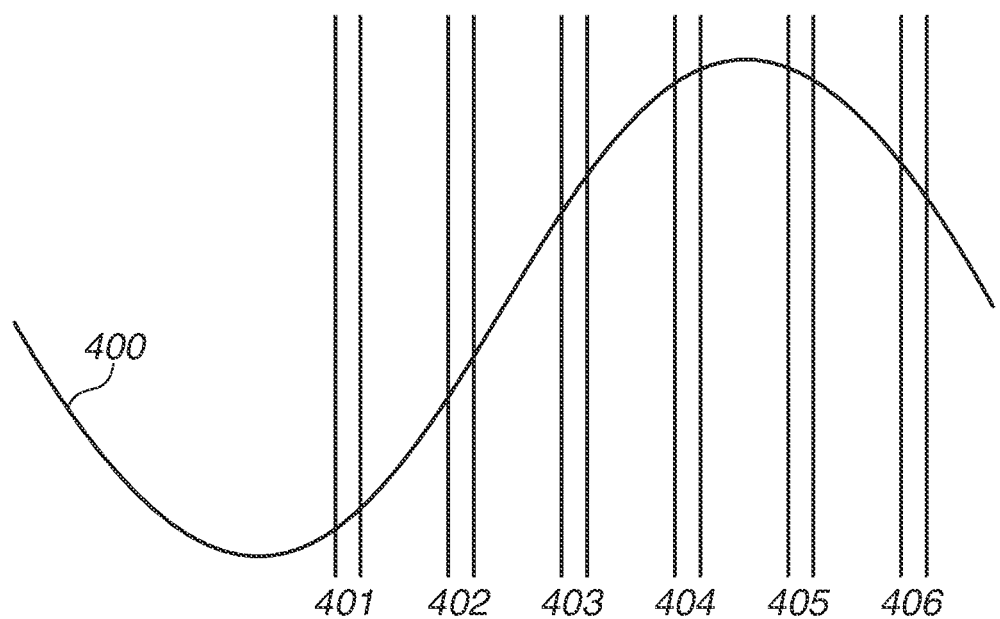
FIG. 4 is a diagram illustrating determination of an occurrence status of a flicker according to the first exemplary embodiment.

FIG. 4 is a diagram illustrating determination of an occurrence status of a flicker according to the present exemplary embodiment. In actuality, the photometric optical system 109 measures an emission cycle and a phase of a light source in an imaging environment. A waveform 400 indicates an example of change in the intensity of light from the light source in the imaging environment, and is a target of observation by the photometric optical system 109. Sections 401 to 406 illustrated in FIG. 4 indicate timings of accumulation operation by the photometric optical system 109. The frequency of the flicker is 50 Hz or 60 Hz in Japan in conformity with the frequency of alternating current. When the frequency of the flicker is 50 Hz or 60 Hz, if the photometric optical system 109 can perform sampling at least at 120 Hz, the flicker can be detected. At the same time, the photometric optical system 109 can also detect the frequency of the flicker.

If no presence of a flicker is detected, or if a flicker does not occur, in step S301 (NO in step S301), the processing proceeds to step S302. In step S302, the imaging element 102 captures an image under an exposure condition calculated by the exposure control unit 107 based on an instruction from the imaging element control unit 108. Next, in step S303, the imaging element 102 captures an image under an exposure condition different from the exposure condition used in step S302 based on an instruction from the imaging element control unit 108. As a result, two images different in brightness can be acquired by performing the two image captures in steps S302 and S303.

If presence of a flicker is detected, or if a flicker occurs, in step S301 (YES in step S301), the processing proceeds to step S304. In step S304, the signal processing unit 104 applies two types of gain to signals acquired by the imaging element 102 by performing one exposure, thereby to acquire two images different in brightness. One of the two gains used by the signal processing unit 104 in step S304 is a gain that brings the image to a correct exposure. Since the two images are acquired with the same exposure by the imaging element 102 in step S304, it is possible to avoid occurrence of a difference in signal value between the images due to flickering. At this time, in order to achieve the effect of extending the dynamic range, the images may be underexposed taking into account the gains applied by the imaging element 102.

In step S304, the imaging element 102 may generate three or more images by applying three types of gain to signals acquired by performing one exposure.

Further, in step S304, more desirable images can be acquired by adjusting an exposure timing for image captures by the imaging element 102 to a peak of the flicker.

Figure 5:
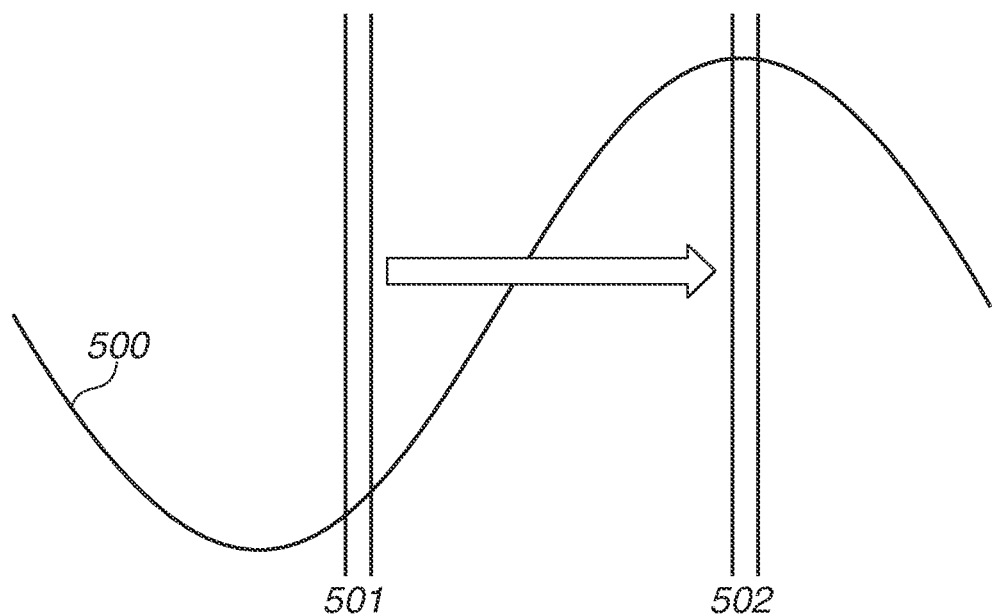
FIG. 5 is a diagram illustrating a relationship between an exposure timing and a flicker peak according to the first exemplary embodiment.

FIG. 5 is a diagram illustrating a relationship between an exposure timing and a flicker peak according to the present exemplary embodiment.

The brightness of the flickering light source is different between when an image capture timing is in a section 501 and when the image capture timing is in a section 502 near a peak of a waveform 500. For example, if a light source such as an LED light source is flickering, an image may be captured with the LED light source turned off depending on the image capture timing. In order to avoid this, it is desirable to perform an exposure in a manner timed to a peak of the flicker based on the emission cycle of the flickering light source specified in step S301.

In step S305, the signal processing unit 104 performs a development process on the images captured by the imaging element 102 in step S302 and step S303, or step 304. In the development process, the signal processing unit 104 applies suitable gamma curves to the respective images so as to match the luminance of the same subject in the images different in brightness.

In step S306, the signal processing unit 104 combines the images captured by the imaging element 102 in step S302 and step S303, or step 304 into an HDR image.

Hereinafter, an HDR rendering process of two images, namely, an underexposed image and an overexposed image, will be described. The underexposed image here refers to an image captured with an underexposure setting if flicker is detected, and refers to an image captured with a low gain setting if no flicker is detected. Similarly, the overexposed image here refers to an image captured with an overexposure setting if flicker is detected, and refers to an image captured with a high gain setting if no flicker is detected.

Figure 6:
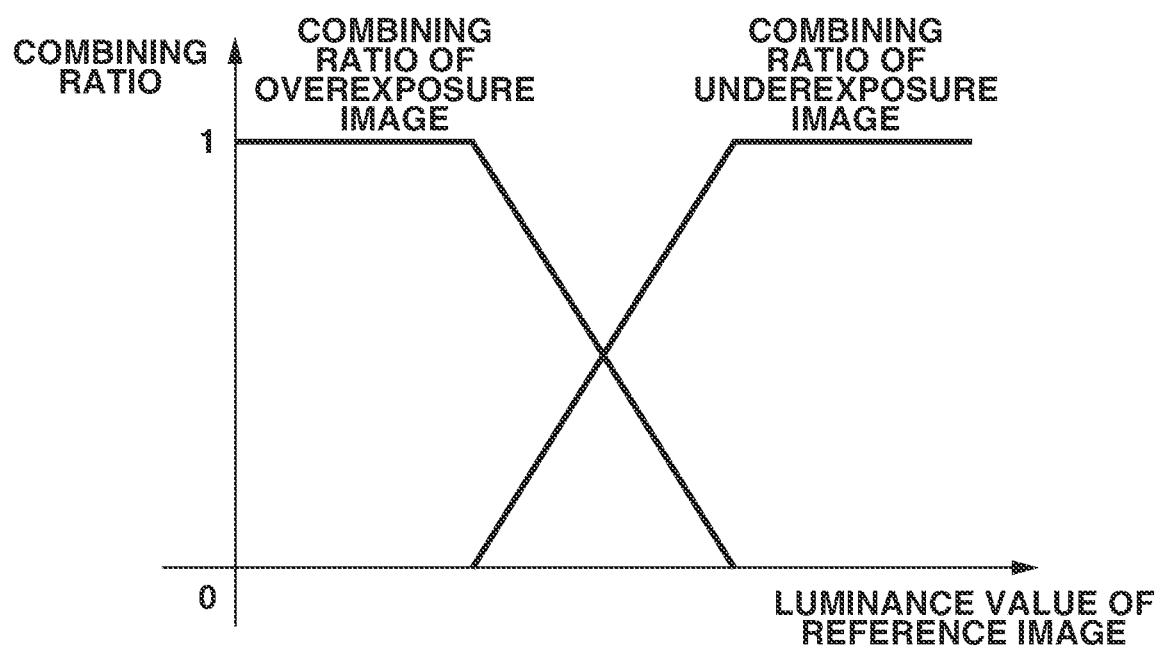
FIG. 6 is a graph illustrating an example of a combining ratio of an underexposed image and an overexposed image according to a second exemplary embodiment.

FIG. 6 is a graph illustrating an example of a combining ratio of the underexposed image and the overexposed image according to the present exemplary embodiment. As illustrated in FIG. 6, for image combining, an image to be a reference for the combining ratio is determined. If the reference image for the combining ratio has low luminance, the overexposed image is used. If the reference image for the combining ratio has high luminance, the underexposed image is used. If the reference image for the combining ratio has luminance in an intermediate range, the combining ratio of the overexposed image and the underexposed image is gradually changed to generate a natural-looking HDR image.

The example of the HDR rendering process using two images has been described above. In the case of using three or more images, similarly, the HDR rendering process can be implemented by setting the combining ratio of the images based on the luminance value of the reference image for the combining ratio.

In the present exemplary embodiment, even in a scene with a flickering light source, it is possible to generate a desirable HDR image while reducing the influence of flicker.

In a second exemplary embodiment, unlike in the first exemplary embodiment, in a case where two images different in brightness are acquired through application of two types of gain to signals acquired by an imaging element 102 by performing one exposure, amounts of the gains are determined based on photometric information acquired by a photometric unit 110.

In order to increase the dynamic range by an HDR rendering process, it is desirable to capture an underexposed image as underexposed as possible, and increase the gain up to a correct exposure at the time of development.

However, if the image captured with an underexposure setting is low in brightness, the gain necessary for raising the luminance to a correct exposure becomes high, and thereby noise may be increased. In the second exemplary embodiment, there is provided a method for extending the dynamic range by determining the gains based on the photometric information without increasing noise beyond necessity.

A configuration of a digital camera in the second exemplary embodiment is similar to that in the first exemplary embodiment, and thus detailed description thereof will be omitted.

Figure 7:
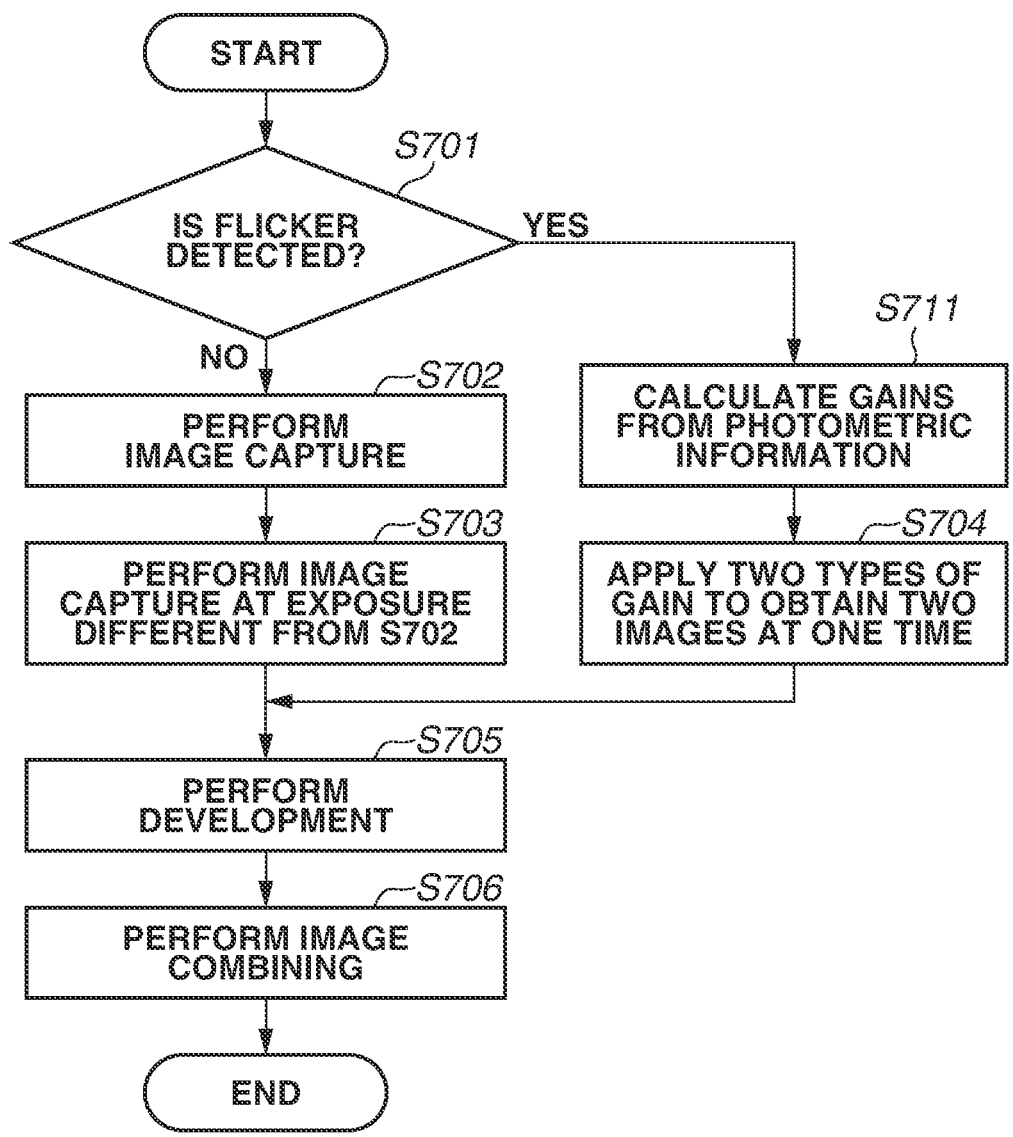
FIG. 7 is a flowchart illustrating HDR rendering according to the second exemplary embodiment.

FIG. 7 is a flowchart illustrating HDR rendering according to the present exemplary embodiment. Step S701 to S706 illustrated in FIG. 7 are similar to steps S301 to S306 in the first exemplary embodiment.

In the present exemplary embodiment, if presence of a flicker is detected, or if a flicker occurs, in step S701 (YES in step S701), the processing proceeds to step S711. In step S711, a signal processing unit 104 calculates gains based on photometric information obtained by the photometric unit 110. Specifically, for example, if the dynamic range in an imaging scene is wide to the high-luminance side, exposure conditions are set to be much lower than those for a correct exposure, and gains are set to be high. In contrast, if the dynamic range in the imaging scene is not so wide, the exposure conditions are set to be slightly lower than those for the correct exposure, and the gains are set to be low.

In step S704, the signal processing unit 104 applies two types of gain by performing one exposure based on the exposure conditions and the gains determined in step S711.

According to the present exemplary embodiment, even in a scene with a flickering light source, it is possible to extend the dynamic range while reducing the influence of a flicker and without increasing noise beyond necessity.

The foregoing exemplary embodiments have been described based on implementation in a digital camera, but the disclosure is not limited to a digital camera. For example, the disclosure can also be carried out in a portable device with a built-in imaging element or a network camera capable of capturing images.

According to the exemplary embodiments of the disclosure, even in a scene with a flickering light source, it is possible to generate a desirable HDR image while reducing the influence of flicker.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-150259, filed Sep. 15, 2021, which is hereby incorporated by reference herein in its entirety.

What is claimed is:

1. An apparatus comprising:
   an image sensor configured to capture a plurality of images with different exposures;
   at least one memory configured to store instructions; and
   at least one processor in communication with the at least one memory and configured to execute the instructions to:
   determine whether a flicker has occurred; and
   combine the plurality of images with different exposures into a combined image by adjusting a combining ratio according to a luminance of a reference image determined from the plurality of images with different exposures,
   wherein the adjustment of the combining ratio is based on luminance level of the reference image to generate the combined image,
   wherein, if the flicker occurs, the image sensor captures the plurality of images with different exposures through application of different gains by performing one exposure, and
   wherein, if the flicker does not occur, the image sensor captures the plurality of images with different exposures by performing a plurality of exposures, and
   wherein, the at least one processor further configured to select, as the reference image, the one of the plurality of images that is captured at a shutter speed set to reduce flicker noise and adjust the combining ration for each pixel position based on whether the luminance at the pixel position in the selected reference image is above or below a predetermined threshold.

2. The apparatus according to claim 1, wherein, if the flicker does not occur, the image sensor captures images of a same subject area by performing the plurality of exposures.

3. The apparatus according to claim 1, wherein the combined image is wider in dynamic range than each one of the plurality of images.

4. The apparatus according to claim 1, wherein, if the flicker occurs, the image sensor captures images in a manner timed to a peak of the flicker.

5. The apparatus according to claim 1, wherein the at least one processor further executes the instructions to:
   acquire photometric information from the image sensor; and
   determine whether the flicker has occurred based on the photometric information.

6. The apparatus according to claim 1,
   wherein the at least one processor further executes the instructions to acquire photometric information from the image sensor, and
   wherein, if the flicker occurs, the image sensor determines a plurality of gains based on the photometric information.

7. The apparatus according to claim 1, further comprising an amplifier,
   wherein, when the image sensor captures the plurality of images through the application of the different gains by performing the one exposure, the amplifier performs the application of the different gains to the plurality of images.

8. An image processing method, comprising:
   capturing a plurality of images with different exposures;
   determining whether a flicker has occurred; and
   combining the plurality of images with different exposures into a combined image by adjusting a combining ratio according to a luminance of a reference image determined from the plurality of images with different exposures,
   wherein the adjustment of the combining ratio is based on luminance level of the reference image to generate the combined image, wherein, if the flicker occurs in the capturing, the plurality of images with different exposures is captured through application of different gains by performing one exposure, and wherein, if the flicker does not occur in the capturing, the plurality of images with different exposures is captured by performing a plurality of exposures, and wherein, the at least one processor further configured to select, as the reference image, the one of the plurality of images that is captured at a shutter speed set to reduce flicker noise and adjust the combining ration for each pixel position based on whether the luminance at the pixel position in the selected reference image is above or below a predetermined threshold.

9. A non-transitory computer-readable storage medium which stores a program for causing a computer of an apparatus to execute a method comprising:

capturing a plurality of images with different exposures;

determining whether a flicker has occurred; and combining the plurality of images with different exposures into a combined image by adjusting a combining ratio according to a luminance of a reference image determined from the plurality of images with different exposures, wherein the adjustment of the combining ratio is based on luminance level of the reference image to generate the combined image, wherein, if the flicker occurs in the capturing, the plurality of images with different exposures is captured through application of different gains by performing one exposure, wherein, if the flicker does not occur in the capturing, the plurality of images with different exposures is captured by performing a plurality of exposures, and wherein, the at least one processor further configured to select, as the reference image, the one of the plurality of images that is captured at a shutter speed set to reduce flicker noise and adjust the combining ration for each pixel position based on whether the luminance at the pixel position in the selected reference image is above or below a predetermined threshold.

* * * * *